March 31, 1964

R. C. FISCHER 3,126,655

LAND FORMING EQUIPMENT

Filed March 26, 1962

2 Sheets-Sheet 1

INVENTOR.
RAYMOND C. FISCHER
BY
ATTY

March 31, 1964  R. C. FISCHER  3,126,655
LAND FORMING EQUIPMENT
Filed March 26, 1962  2 Sheets-Sheet 2
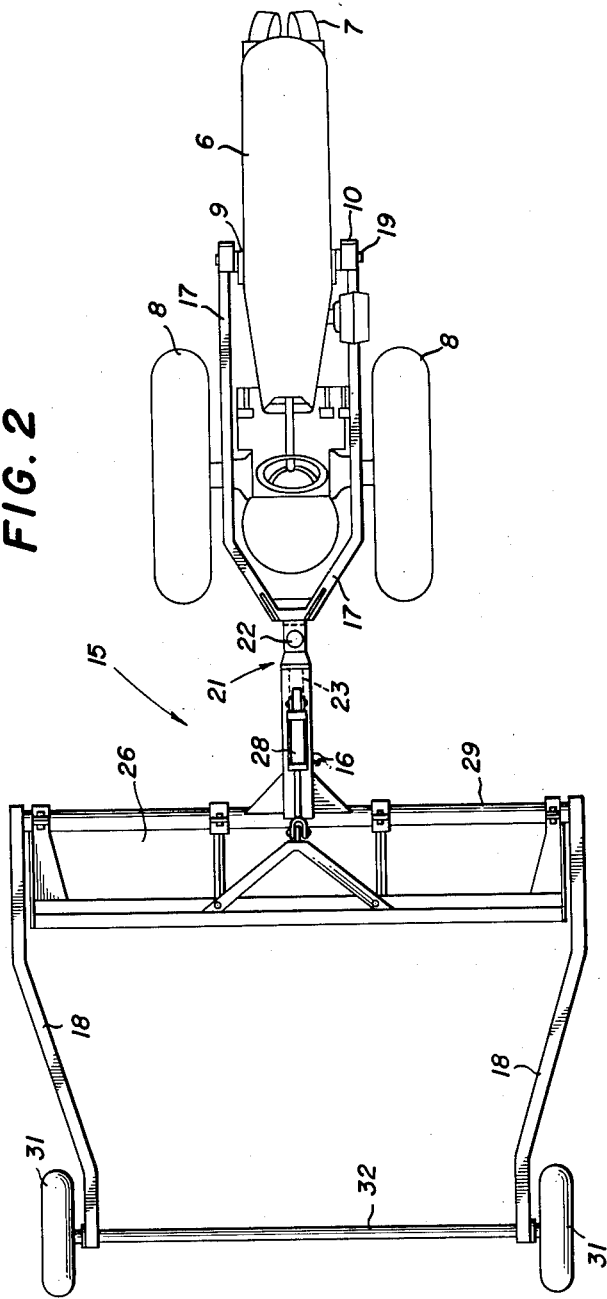
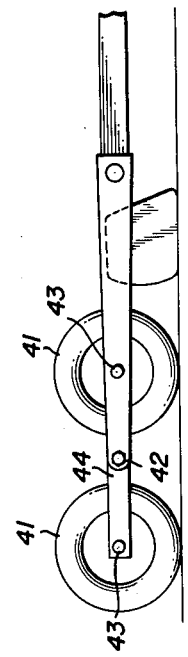
INVENTOR.
RAYMOND C. FISCHER
BY Paul O. Pippel
ATTY United States Patent Office 3,126,655
Patented Mar. 31, 1964

3,126,655
LAND FORMING EQUIPMENT
Raymond C. Fischer, Hinsdale, Ill., assignor to International Harvester Company, Chicago, Ill., a corporation of New Jersey
Filed Mar. 26, 1962, Ser. No. 182,344
3 Claims. (Cl. 37—169)

The present invention relates to land forming equipment and more particularly to a land plane adapted to be used with a farm tractor or other relatively small power drive unit.

In the past land planes have been very large, some of them having a wheel base up to 80 feet. The reason for such a size is that great length is required to obtain a level surface. Initial cost of such land planes has been high because of the heavy bridge frame structure required and the large number of wheels. Also the operating cost of such a plane is high because of the large power drive unit required. Furthermore, a land plane of this size is difficult to maneuver and it is impossible to get into corners with such a plane.

Those concerned with the development of land planes have long recognized the need for an effective land plane that can be powered by a small drive unit such as a farm tractor. The present invention fulfills this need.

An object of the present invention is the provision of a land plane having minimum vertical blade travel due to the undulating ground, relative to the vertical displacement of the supporting wheel, and of a size that can be pulled by a farm tractor or the like.

Another object is to provide a land plane that has increased maneuverability.

A further object of the invention is the provision of a land plane in which the plane is never lifted as high as the rises in the surrounding terrain.

Still another object is to provide a land plane wherein the ground-engaging wheels are mounted on pairs of tandem axles to minimize vertical blade travel.

Figure 1:
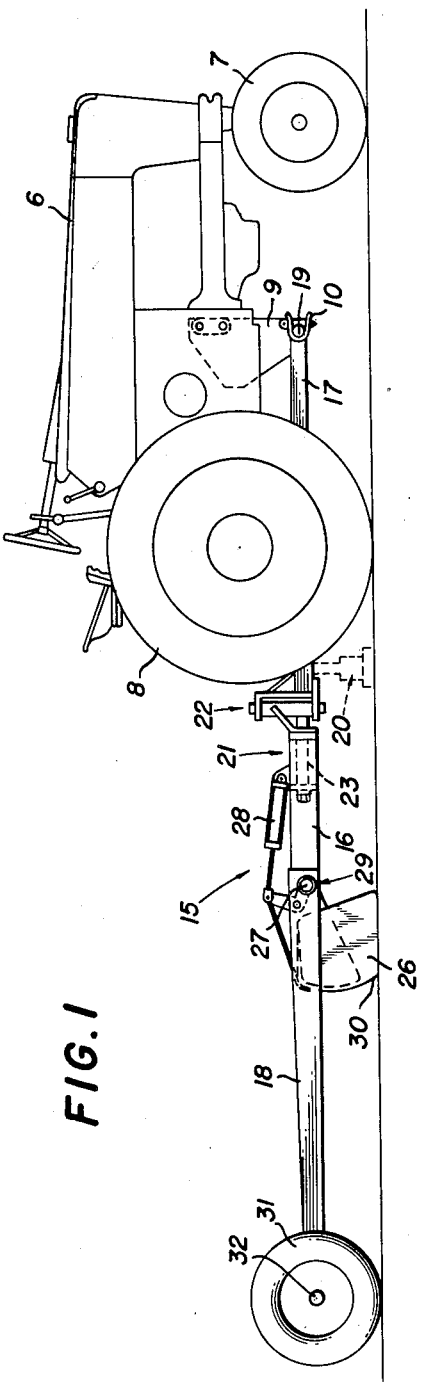
Figure 4:
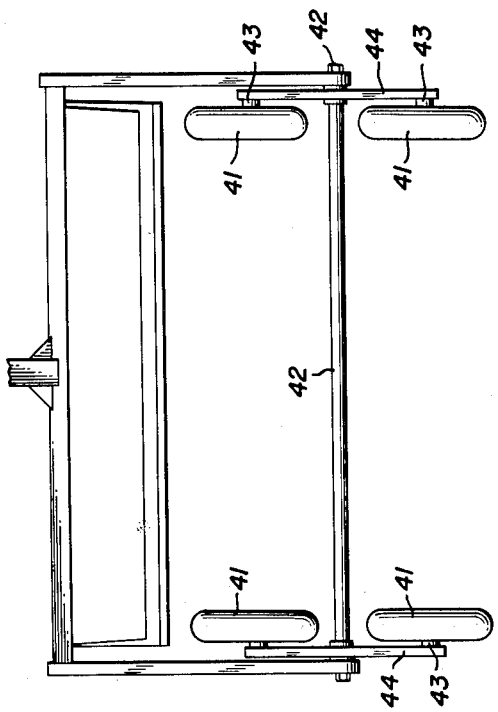

FIG. 1 is a side elevation view of the land plane hitched to a farm tractor;
FIG. 2 is a top view of FIG. 1;
FIG. 3 is a modification of the land plane shown in FIG. 1; and
FIG. 4 is a top view of FIG. 3.

Referring now to the drawings wherein like reference characters designate like or corresponding parts throughout the several views, there is shown in FIG. 1 a power drive unit or tractor 6 having front wheels 7 and back wheels 8. Mounted on the tractor at approximately its midpoint are a pair of first coupling means including reinforced plates 9, said plates having portions that extend below the under surface of the tractor. Secured to these portions are pivot mountings 10.

The land leveling device designated generally as 15 consists of an elongated frame 16, made up of two main section, a forward or hitching section and a rearward or following section 18. The hitching section includes a pair of parallel arms 17 having second coupling means comprising pivot pins 19 mounted on their forward ends. These pivot pins 19 along with the pivot mountings 10 constitute the connection means for securing the land plane to the power drive unit or tractor. As can be seen in FIGS. 1 and 2, this connection means allows the hitching section of the frame to pivot about a horizontal transverse axis only. A jack stand 20 can be provided to support the hitching section in a horizontal position when not connected to the following section of the frame. Normally the hitching and following frame sections would be connected at all times. To detach from the tractor, the jack would be used to support the frame from the ground. After removing the pins that secure pivot pins 19 to pivot mounting 10, backing the tractor enough so 19 clears 10 fore and aft, and the jack adjusting the frame down so that the pivot pins clear the mounting vertically, the tractor may be driven away from the implement.

A joint is provided between the hitching section and the following section of the frame. This joint can pivot about two axes; first a vertical axis 22 and second, a horizontal axis 23 which is parallel to the longitudinal axis of the land leveling device, thus allowing the following section of the land leveling frame to pivot with respect to the hitching section about the vertical axis 22 or about the horizontal axis 23, and to allow the entire frame 16 to pivot with respect to the tractor or power drive unit about the horizontal pivot pins 19.

The transverse blade 26 is pivotally mounted to the following section 18 of the frame through an axle 27 that is journaled in a tubular cross bar 29 of said following section. The position of the blade with respect to the frame is controlled by a conventional blade regulating device 28. Cutting edge 30 of the transverse blade is located with respect to the land leveling frame at a point to the rear of said frame's midpoint. The blade is so located because any rise in the terrain that the wheels of the tractor goes over will be cut down by the blade and therefore the rise will not be as high when the rear wheels of the land levelling device engage the same rise.

The wheels 31 of the land levelling device are mounted on an axle 32 which is secured to the frame at its rearwardmost point on an axis transverse to the longitudinal axis of said land leveling frame.

Referring now to FIGS. 3 and 4 which illustrate a modified version of the wheels of the land levelling device as disclosed in FIGS. 1 and 2, there is shown tandem wheels 41 on each side of the frame. The wheels 41 are rotatably mounted on the ends of supports 44 which in turn are pivotally mounted to an axle 42 which is secured to the rearwardmost portion of the frame and is transverse to the longitudinal axis of the land leveling frame. This tandem wheel arrangement decreases the amount of vertical rise of the rearmost portion of the frame as a result of one of the wheels 41 going over a rise. As the front wheel 41 rolls over a rise in the terrain the axle 42 will be lifted only one-half the distance of said rise. Thus the resulting vertical rise of the transverse blade will be considerably decreased.

*Operation*

Assuming that the land leveling plane has been connected to a farm tractor as illustrated in FIGS. 1 and 2 of the drawings, and the implement is being used for the final smoothing or planing operation of a field. The front wheels of the tractor will be the first to engage a rise in the terrain. This rise will cause the front wheels of the tractor to be elevated, which elevation will be transmitted to the land leveling plane through the connecting means 10 and 19. Pivot pins 19 of the land leveling frame will not be elevated the same amount as is the front wheels of the tractor, but rather will be elevated approximately one-half this amount. The elevation of the pivot pins 19 will in effect pivot the entire frame 16 about the axle 32. Since the cutting edge 30 of the transverse blade 26 is located with respect to the frame 16 rearward of its midpoint, said cutting edge will be elevated less than one-half the amount that pivot pins 19 have been elevated. Thus it is seen that when the front wheels 7 of the tractor engage a rise in the terrain the cutting edge 30 of the blade is elevated a height considerably less than the height of said rise. It has been found that a land leveling plane and tractor of the scale shown in FIGS. 1 and 2 will result in approximately one-sixth of a vertical blade rise as compared to a rise in the terrain. When the rear wheels 8 of the tractor engage the same rise, pivot pins 19 will again be elevated approximately one-half of the height of said rise and the cutting edge of the blade will again be elevated something less than one-half of the rise given to the pivot pins 19. The rise in the terrain will next be contacted by the transverse blade 26 and its height will be cut down considerably by said blade. When the rear wheels 31 of the land leveling plane engage the rise, they will not be elevated nearly as much as the wheels of the tractor since the rise has been reduced by the blade. For this reason the transverse blade has been located closer to the rearward end of the frame than to the forward end. It should be noted that since the joint 21 has no horizontal pivotal axis transverse to the longitudinal axis of the land leveling plane the effective length of the land leveling plane is from pivot pins 19 to the axle 32.

When the tractor is turned the land leveling plane breaks or pivots about the joint 21. The result of this is that while the effective length of the land leveling plane is from pivot pins 19 to the axle 32, the plane can make a corner as though its length was from vertical axis 22 of joint 21 to axle 32. The horizontal axis 23 of joint 21 being parallel to the longitudinal axis of the land leveling plane permits the following section of the land leveling frame to rotate with respect to the hitching section and the tractor, thus providing for situations where one wheel of the land leveling device engages a rise and the other remains on the normally level ground.

If the land leveling device has been provided with tandem wheels as disclosed in FIGS. 3 and 4 of the drawings, the resulting rise of axle 42 as a result of a rise in the terrain will be reduced in half. This is a result of mounting the wheels 41 on the ends of the support 44 which are pivotally carried by the axle 42.

Thus a land leveling plane has been provided with an effective length in excess of that of its actual length and with maneuverability of a plane having a length considerably shorter than its effective length.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. In a land leveling device of the type having an elongated frame, wheels secured to the rear end of said frame on an axis transverse to said frame, a transverse blade secured to said frame and spaced from said rear end, first coupling means on the forward end of said frame, a two axle power drive unit, second coupling means on said power drive unit between said axles cooperating with said first coupling means to connect said frame to said power drive unit in such a manner as to reduce the amount of vertical travel of the blade as a result of rises and falls in the terrain, said frame including a joint means located between the blade and said forward end to facilitate turning of the levelling device, and wherein said joint means will permit movement only about a vertical axis and about a horizontal axis parallel to the longitudinal axis of said elongated frame.

2. The invention as set forth in claim 1 wherein said means connecting the forward end of the elongated frame to the power drive unit will permit pivotal motion about a horizontal axis.

3. The invention as set forth in claim 2 wherein said means connecting the elongated frame and the power drive unit will not permit pivoting about a vertical axis.

References Cited in the file of this patent
UNITED STATES PATENTS

| | | |
|---|---|---|
| 1,901,684 | White | Mar. 14, 1933 |
| 1,916,864 | Maloon | July 4, 1933 |
| 2,593,679 | Kaupke | Apr. 22, 1952 |
| 2,795,060 | Geiszler | June 11, 1957 |
| 2,886,906 | Moses | May 19, 1959 |